(12) United States Patent
Zhang et al.

(10) Patent No.: US 11,030,247 B2
(45) Date of Patent: Jun. 8, 2021

(54) LAYERED GRAPH DATA STRUCTURE

(71) Applicant: Electronic Arts, Inc., Redwood City, CA (US)

(72) Inventors: Xinfeng Zhang, Shanghai (CN); Jian Li, Shanghai (CN); Frank Yang, Redwood City, CA (US); Guowen Feng, Shanghai (CN); Wen Ren, Shanghai (CN); Anand Nair, Atlanta, GA (US); Jian Zhou, Shanghai (CN)

(73) Assignee: Electronic Arts Inc., Redwood City, CA (US)

( * ) Notice: Subject to any disclaimer, the term of this patent is extended or adjusted under 35 U.S.C. 154(b) by 315 days.

(21) Appl. No.: 15/872,514

(22) Filed: Jan. 16, 2018

(65) Prior Publication Data

US 2019/0205480 A1 Jul. 4, 2019

(51) Int. Cl.
*G06F 16/901* (2019.01)
*G06F 16/22* (2019.01)
*G06F 16/903* (2019.01)

(52) U.S. Cl.
CPC ...... *G06F 16/9024* (2019.01); *G06F 16/2228* (2019.01); *G06F 16/90348* (2019.01)

(58) Field of Classification Search
USPC ....................................................... 707/798
See application file for complete search history.

(56) References Cited

U.S. PATENT DOCUMENTS

| | | | | |
|---|---|---|---|---|
| 2005/0111562 | A1* | 5/2005 | Koyanagi | G10L 19/26 704/E19.047 |
| 2015/0120697 | A1* | 4/2015 | Asner | G06F 17/30 707/714 |
| 2015/0370919 | A1* | 12/2015 | Bornhoevd | G06F 17/30 707/798 |
| 2017/0147705 | A1* | 5/2017 | Kasperovics | G06F 17/30 |
| 2017/0169133 | A1* | 6/2017 | Kim | G06F 16/9024 |
| 2017/0337260 | A1 | 11/2017 | Wang et al. | |
| 2018/0039692 | A1 | 2/2018 | Wang et al. | |

FOREIGN PATENT DOCUMENTS

| | | |
|---|---|---|
| CN | 101196933 | 6/2008 |
| CN | 103631839 | 3/2014 |
| CN | 104573133 | 4/2015 |
| CN | 104636478 | 5/2015 |
| WO | 2016127739 A1 | 8/2016 |
| WO | 2016127740 A1 | 8/2016 |

OTHER PUBLICATIONS

The PCT Search Report and Written Opinion dated Sep. 26m 2018 for PCT application No. PCT/CN2017/119869, 9 pages.

* cited by examiner

*Primary Examiner* — Muluemebet Gurmu
(74) *Attorney, Agent, or Firm* — Lee & Hayes, P.C.

(57) ABSTRACT

A layered graph data structure can be stored using a vertex table and an edge table. The vertex table includes a vertex identifier column and a first graph identifier column. The edge table includes a second graph identifier column, a node identifier column, and an edge type column. Queries of the layered graph data structure include a target entity and a graph level, and iterative searching of the vertex table and the edge table is performed based on the graph level and data stored in edge type column.

18 Claims, 8 Drawing Sheets

| Vertex_ID | Graph_ID |
|---|---|
| 111 | 210 |
| 112 | 210 |
| 113 | 210 |
| 121 | 220 |
| 122 | 220 |
| 123 | 220 |
| 124 | 220 |
| 131 | 230 |
| 132 | 230 |
| 141 | 240 |
| 142 | 240 |
| 143 | 240 |
| 151 | 250 |
| 152 | 250 |
| 161 | 260 |

450

| Graph_ID | Node_1_ID | Node_2_ID | Edge_Type |
|---|---|---|---|
| 210 | 111 | 112 | Internal |
| 210 | 112 | 113 | Internal |
| 210 | 113 | 131 | External |
| 210 | 113 | 124 | External |
| 220 | 121 | 122 | Internal |
| 220 | 122 | 123 | Internal |
| 220 | 123 | 124 | Internal |
| 220 | 124 | 113 | External |
| 230 | 131 | 132 | Internal |
| 230 | 131 | 113 | External |
| 230 | 131 | 161 | External |
| 230 | 132 | 141 | External |
| 230 | 132 | 151 | External |
| 240 | 141 | 142 | Internal |
| 240 | 141 | 143 | Internal |
| 240 | 142 | 143 | Internal |
| 240 | 141 | 132 | External |
| 250 | 151 | 152 | Internal |
| 250 | 151 | 132 | External |
| 260 | 161 | 132 | External |

LAYERED GRAPH DATA STRUCTURE

CROSS-REFERENCE TO RELATED APPLICATION(S)

This application claims priority to PCT Application No. PCT/CN2017/119869, filed on Dec. 29, 2017 and entitled "Layered Graph Data Structure," the entirety of which is incorporated herein by reference.

TECHNICAL FIELD

The following disclosure relates to the technical fields of database storage and database architectures.

BACKGROUND

The ubiquity of computing systems and the Internet has led to a sharp increase in the usage of computers not only by businesses and other organizations, but also individual consumers. Today, it is common for some individuals to use multiple computing devices, such as a personal laptop, a business laptop, a mobile computing device (e.g., a smartphone), a console gaming device, and/or a tablet computing device. It is also common for some individuals to have numerous user accounts for multiple eCommerce websites, gaming and entertainment websites, social media websites, and personal finance websites, as just some examples. The continued growth in computer use among individuals, businesses, and organizations creates a demand for ways to store data related to users that are more efficient than what may be offered by traditional databases.

Early databases included flat files where individual applications managed the data stored in the flat files. Later, more advanced relational database systems used dedicated database programs, instead of individual applications, for managing and accessing data. Relational database systems typically employ a relational data model where data is stored in a set of tables, each with respective rows. Rows represent instances of data items, and the columns represent attributes (e.g., "name") which may be shared across data items.

Relational database systems inherently place restrictions on how data can be stored. For example, data item instances cannot have attributes other than those that are specified as columns in the table. Moreover, an attribute value in one table representing a real-world value (e.g., a user name string) typically does not point to the same value in another table. Instead, relational databases generally use automatically generated primary keys or unique identifiers, and some relationships require special tables for modeling relationships. The structure of a traditional relational database system can lead to applications using a large number of tables, and as the number of tables increases, and the amount of data stored in each table increases, data searches can take exponentially longer to complete requiring more resources or decreasing response time.

Some domains are efficiently modeled using graphical data modeling techniques. In graphical data modeling, data domains are modeled using vertices and edges connecting the vertices. In some graphical data models, edges can correspond to a specific relationship between the vertices they connect. Social networks and product catalogs may lend themselves naturally to graphical data modeling. For example, in a social network, users and employers may be modeled as vertices, and edges might correspond to relationships such as "is a friend of" or "works for."

Since the structure of graphical data models is different than a relational data model, using a traditional relational database for storing data modeled as a graph can create inefficiencies such as unnecessarily large database sizes. These inefficiencies can lead to the unnecessary consumption of resources, inefficient searches, slow query response times, or increased cost for data storage.

BRIEF DESCRIPTION OF THE DRAWINGS

FIG. 4 shows example tables and data entries for storing a layered graph data structure consistent with disclosed embodiments.

DETAILED DESCRIPTION

Figure 1:
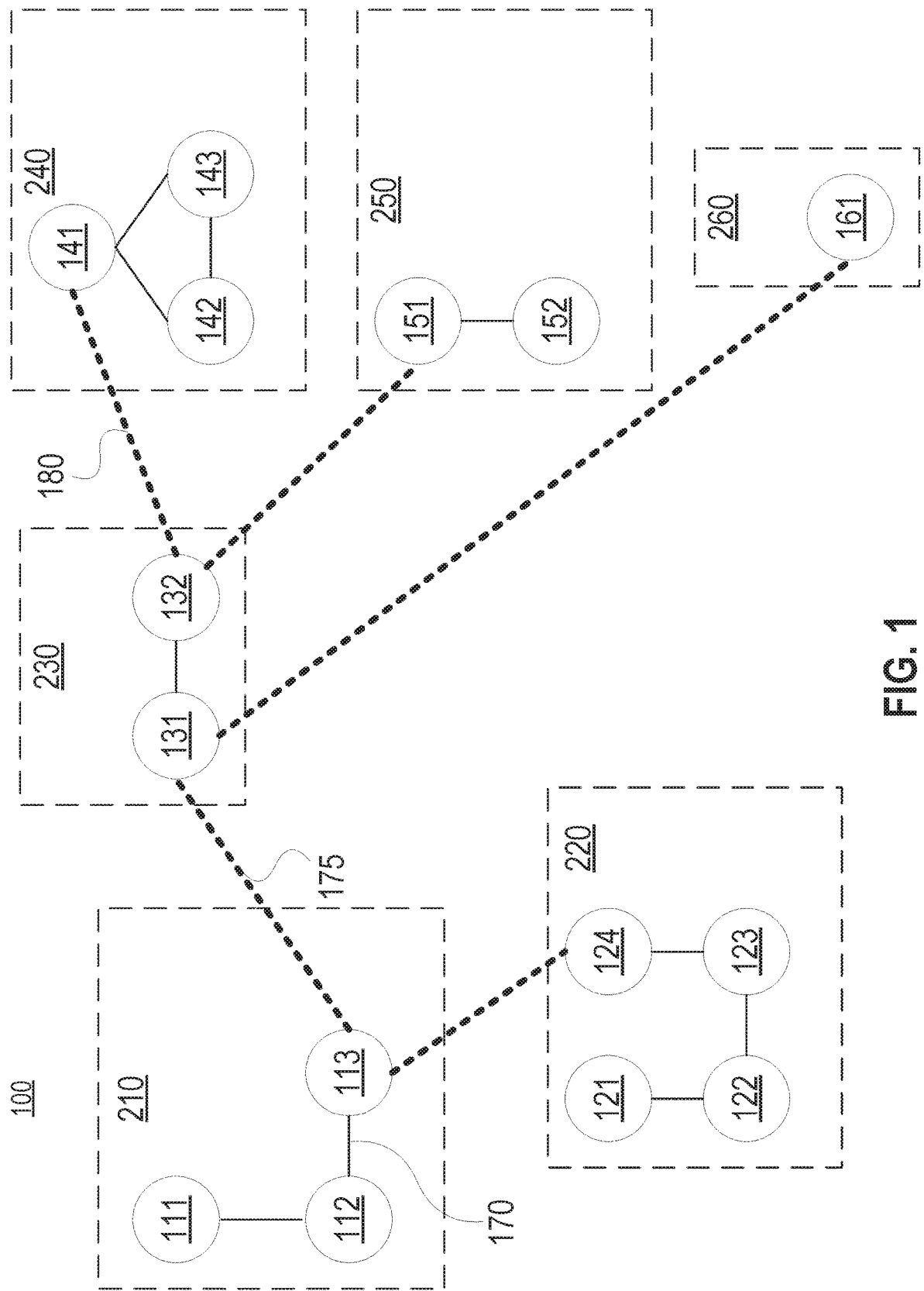
FIG. 1 shows an example primary layer of a layered graph data structure consistent with disclosed embodiments.

The present disclosure describes embodiments of a layered graph data structure, storage of data using the layered graph data structure, and query processing of a layered graph data structure. The disclosed embodiments provide technical improvements over existing data models, such as relational data models, for data domains having tiered, hierarchical, layered or graphical data. Such applications can include, but are not limited to, social media networks, product catalogs, employee or human resource management systems, and document management systems, as just some examples.

Tiered, hierarchical, layered or graphical data domains can be modeled using graphs. The graphs can be defined as a set of vertices linked together by a set of edges. Storing the graphs using a relational database can be inefficient since a relational data model is inherently different than a graphical data model. For example, storing graphical datasets in a relational database may include using one or more tables storing attributes of vertices, one or more tables storing information about the graphs, and one or more link tables that associate rows of the tables storing attributes of the vertices to rows of the tables storing information about the graphs. As the size of a graphical dataset increases, the size of the database storing the graphical dataset may grow exponentially in relation to the size of the graphical dataset, causing inefficiencies in the amount of storage needed. Moreover, the increase in size can also increase query response time or may require additional computing resources to maintain query response time.

To address the technical problems identified above, the disclosed embodiments provide a technical solution in the form of a layered graphical data structure that leverages the inherent layered structure of graphs to optimize data storage. This solution decreases the number of resources required to store graphical datasets by more closely aligning the database structure with the graph of the data domain. The solution also improves query response times in at least two ways. First, since less data is stored than what would be needed using conventional data storage techniques, query response times are faster. Second, due to the database structure of disclosed embodiments, the depth of searches in to the dataset can be limited to what is needed for a particular application.

The technical advantages of the disclosed embodiments can be achieved, in part, by storing the layered graph data structure using two tables—a vertex table and an edge table. The rows of the vertex table represent vertices in the layered graph structure where the rows of the edge table represent an edge connecting two vertices. Both the vertex table and the edge table include a graph identifier column that serves as a link between rows of the vertex table and rows of the edge table. In some embodiments, the vertex table and the edge table store the vertices and edges of first, or primary, layer of the layered graph data structure.

According to some embodiments, the vertex table includes a vertex identifier column and a graph identifier column. The rows of the vertex column represent a mapping for a vertex of the layered graph data structure (stored in the vertex identifier column) to an identifier for that vertex's associated graph (stored in the graph identifier column).

As the number of vertices in the layered graph data structure increases, the vertex table can be scaled using sharding. Sharding is a database design technique where rows of a database table are held separately, rather than being split into columns (which is what normalization and vertical partitioning do, to differing extents). Each partition forms part of a shard, which may in turn be located on a separate database server or physical location in a distributed computing system. In some embodiments, the vertex table can be sharded based on vertex identifier, which can improve query response times as described in more detail below.

According to some embodiments, the edge table includes a graph identifier column, a first node identifier column, and second node identifier column, and an edge type column. Each row of the edge table represents a connection between a first vertex (stored in the first node identifier column) and a second vertex (stored in the second node identifier column). A data value stored in the edge type column describes the type of edge connecting the first vertex and the second vertex. As explained in more detail below, the edge type can convey whether the edge between the two vertices are within the same graph (an internal edge), or whether the edge between the two vertices connects two graphs (an external edge). Like the vertex table, as the edge table scales in size, it can be sharded to distribute the storage of data across different servers or physical locations. In some embodiments, the edge table can be sharded based on graph identifier, which can improve query response times.

The disclosed embodiments also provide an additional technical advantage by providing a query service that can find, for a provided target entity, related entities based on graph level. For example, the query service may provide an application programming interface (API) that accepts as parameters a target entity identifier and a graph level, searches the layered graph data structure to the requested graph level, and returns entities found at the requested graph level.

Graph levels provided in a request for related entities correlate to layers of the layered graph data structure. A graph level can indicate, for example, either the number of external edges between a target entity and related entities at the primary layer of the layered graph data structure, or it can indicate the layer at which the target entity and related entities are directly connected. For example, a graph level of 3 may indicate that two entities have three external edges between them at the primary layer of the layered graph data structure or that the entities are directly connected at the third layer of the layered graph data structure.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 illustrates an example primary layer of layered graph data structure 100 consistent with disclosed embodiments. The primary layer can be the first layer of layered graph data structure 100. Layered graph data structure 100 has vertices 111-113, 121-124, 131, 132, 141-143, 151, 152, and 161. According to some embodiments, the vertices represent an entity. For example, the vertices can represent individual users, user accounts, product, or organizations. The vertices can also represent entities within a given context. For example, the vertices can represent a user's computing device, a geographic location of an office for an organization, a product having certain attributes or the like. According to some embodiments, the vertices of the primary level of the layered graph data structure can correspond to the most granular level of data stored.

Layered graph data structure 100 can include one or more logical subgraphs 210, 220, 230, 240, 250, 260. The logical subgraphs can each include one or more vertices that can be logically grouped together based on the domain layered graph data structure 100 models. For example, logical subgraphs 210, 220, 230, 240, 250, 260 can each correspond to a user, and in each of logical subgraphs 210, 220, 230, 240, 250, 260 respective vertices can correspond to a user account operating on a user computing device. For example, subgraph 210 can correspond to a user named John, and vertex 111 can correspond to a social media account accessed on a mobile device for John, vertex 112 can correspond to eCommerce account of John accessed via a PC, and vertex 113 can correspond to a gaming profile of John accessed via a gaming console.

The vertices of the layered graph data structure 100 can be connected by edges, such as edges 170, 175. Edges can have an edge type that indicates whether the edges connect vertices of the same subgraph or whether the edges connect the vertex of a first subgraph to the vertex of second subgraph. Edge types connecting vertices of the same subgraph can be considered internal edges. For example, edge 170 is an internal edge because it connects vertex 112 and vertex 113 which are both part of subgraph 210. Edge types connecting vertexes of different subgraphs can be considered external edges. For example, edge 175 is an external edge because it connects vertex 113, which is part of subgraph 210, and vertex 131, which is part of subgraph 230.

In some embodiments, layered graph data structure 100 can include edge types in addition to the internal edge type and the external edge type, and these additional edge types may indicate a special relationship between the vertices they connect. The additional edge types can be specific examples of an external edge type. For example, user-account vertices can be connected by an edge type indicating that the connected vertices are "friends" or "coworkers" in a social media environment. As another example, vertices representing accounts or avatars for a massive multiplayer role playing game (MMRPG) can be connected by an edge type indicating that connected vertices are part of the same team or campaign.

The additional edge types can also be specific examples of internal edge types. For example, computing-device vertices can be connected by an edge type indicating that the connected vertices are part of a related operating platform or operating system. As another example, vertices representing different product configurations can be connected by an edge type indicating that connected vertices are different versions of the same product, or have a particular attribute such as color or size.

In some embodiments, the vertices of the primary layer correspond to an elemental data type, which can be the most conceptually granular data type in the data domain for which layered graph data structure 100 is modeling. For example, the vertices of the primary layer can correspond to product stock keeping units (SKUs) in a product catalog domain. As another example, the vertices of the primary layer can correspond to a user account associated with a specific computing device in a social media domain. At higher levels of the layered graph data structure, some external edge types become logical internal edge types. For example, external edge 175 of layered graph data structure 100, which connects logical subgraph 210 and logical subgraph 230, can become a logical internal edge type at the second layer of layered graph data structure 100 connecting logical vertex 210 with logical vertex 230 (which may be part of a higher level graph at the second layer). Stated differently, at the second layer of layered graph data structure 100, logical subgraph 210 and logical subgraph 230 can be thought of as logical vertices directly connected by edge 175.

Figure 2:
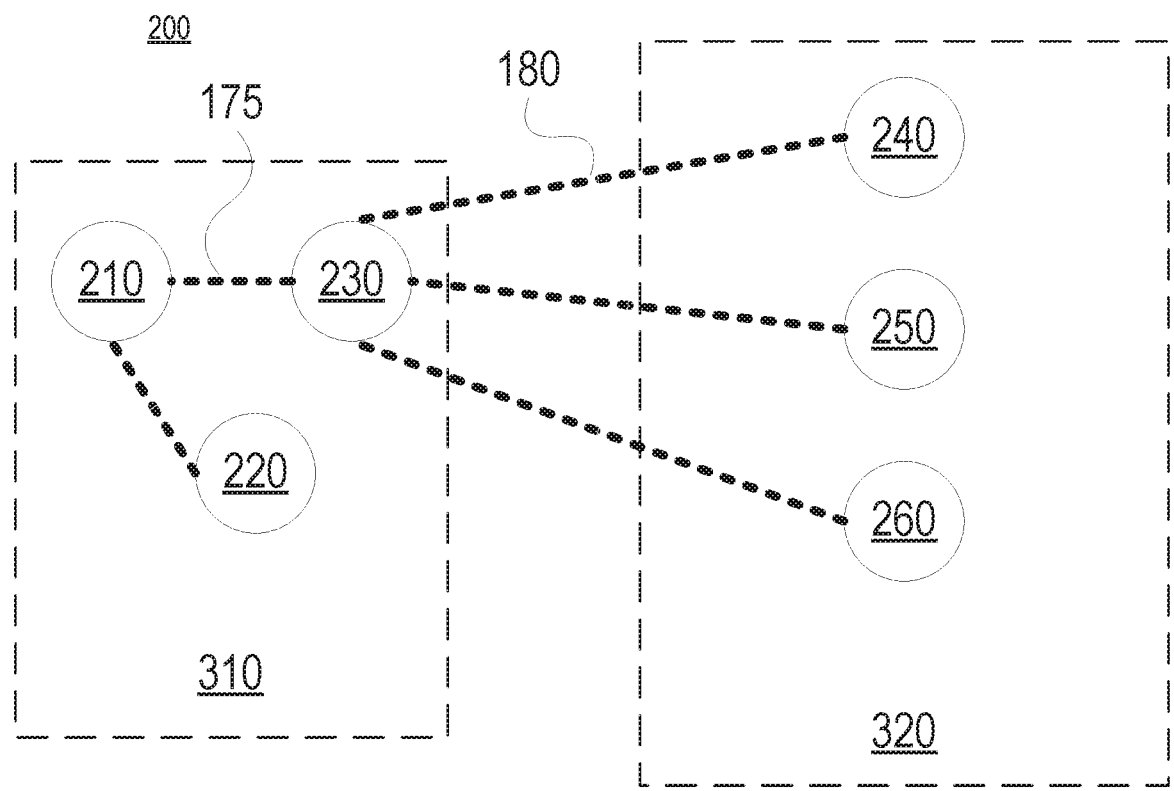
FIG. 2 shows an example second layer of the example layered graph data structure of FIG. 1 consistent with disclosed embodiments.

FIG. 2 shows one example of a second layer 200 of layered graph data structure 100. While FIG. 2 illustrates the same layered graph data structure 100 as FIG. 1, it is from a second-layer viewpoint. For example, comparing FIG. 1 to FIG. 2, subgraphs 210, 220, 230, 240, 250, 260 of FIG. 1 are illustrated as logical vertices in FIG. 2. As shown in FIG. 2, subgraph 210, subgraph 220 and subgraph 230 of layered graph data structure 100 are depicted as logical vertices belonging to logical subgraph 310, which is a second layer subgraph of layered graph data structure 100. Within logical subgraph 310, subgraph 210 (or logical vertex 210 of the second layer) is connected to subgraph 230 (or logical vertex 230 of the second layer) by external edge 175 (or logical internal edge 175).

Further comparing FIG. 1 (illustrating the primary layer of layered graph data structure 100) to FIG. 2 (illustrating the second layer of layered graph data structure 100), FIG. 2 illustrates subgraphs that are two-external-edge separated (e.g., subgraph 210 and subgraph 240) in FIG. 1 as separated by one external edge. For example, as shown in FIG. 2, subgraph 210 (logical vertex 210 of the second layer) and subgraph 240 (logical vertex 240 of the second layer) are connected via external edge 180.

Figure 3:
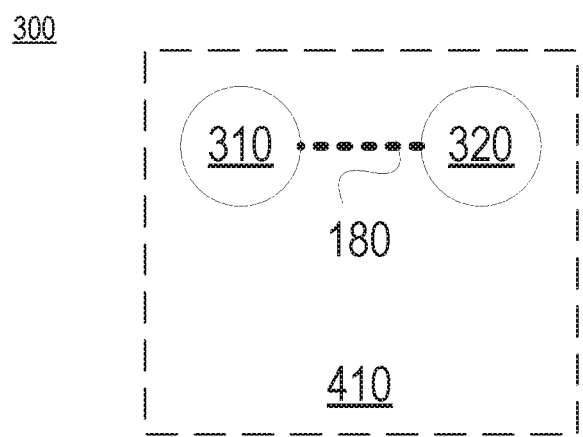
FIG. 3 shows an example third layer of the example layered graph data structure of FIG. 1 consistent with disclosed embodiments.

FIG. 3 shows an example of a third layer 300 of layered graph data structure 100. While FIG. 3 illustrates the same layered graph structure 100 as FIGS. 1 and 2, it is from a third-layer viewpoint. For example, comparing FIG. 2 and FIG. 3, subgraphs 310 and 320 of FIG. 2 are connected by external edge 180, but are illustrated as logical vertices in FIG. 3 connected by logical internal edge 180 of the third level within subgraph 410.

The above discussion uses the term "logically" to describe relationships between vertices at the layers of layered graph data structure 100 because in certain implementations, edges between subgraphs at layers above the first or primary layer exist conceptually, but are not expressly stored in the data tables defining the layered graph data structure 100. In some embodiments, regardless of the number of layers, a layered graph data structure can be stored using two data tables, a vertex table and an edge table. The tables store edge types as they exist within the primary layer, and processing logic can access and process the data to identify relationships between vertices and/or subgraphs at different layers within the graph structure.

FIG. 4 shows example data tables and data entries for storing a layered graph data structure consistent with disclosed embodiments. The example data tables and data illustrate one example of how all layers of layered graph data structure 100 can be stored in two tables. Although layered graph data structure 100 has three conceptual layers, FIG. 4 illustrates tables storing data corresponding to the primary layer of layered graph data structure 100.

In some embodiments, the data tables include vertex table 450. Vertex table 450 can include vertex identifier column 452 and first graph identifier column 453. Consistent with disclosed embodiments, vertex table 450 can include one or more data rows, where each of the one or more data rows corresponds to a vertex. In some embodiments, the data rows of vertex table 450 correspond to vertices of the primary layer of a layered graph data structure. But vertex table 450 can include vertices of other layers of the layered graph data structure in certain embodiments.

In a data row of vertex table 450, the data entry in vertex identifier column 452 corresponds to a value identifying a vertex of the layered graph data structure and the data entry in first graph identifier column 453 corresponds to a value identifying a graph or subgraph to which the vertex identified in vertex identifier column 452 belongs. For example, as shown in FIG. 4, the vertex identified with Vertex_ID 111 is part of the graph identified by Graph_ID 210, and the vertex identified with Vertex_ID 143 is part of the graph identified by Graph_ID 240.

Although not shown explicitly in FIG. 4, additional data related to the vertices of the layered graph data structure can be stored in vertex table 450. For example, if vertices correspond to user accounts, vertex table 450 can include data about users such as login credentials, email addresses, and phone numbers, as just some examples, or vertex table 450 can include one or more column storing values linking to additional data tables storing user related information. Also, while not shown in FIG. 4, in some embodiments, vertex table 450 can include columns related to database management such as a unique key column, record state columns, and/or modification information columns (e.g., last edited, user edited, etc.).

The data tables storing the layered graph data structure can also include edge table 470. As noted above, an edge in the layered graph data structure can be defined as the connection between two vertices (referred to as "nodes" in edge table 470), and edges can include an edge type describing the nature of the connection between the two vertices.

According to some embodiments, edge table 470 can include second graph identifier column 472, first node identifier column 474, second node identifier column 476, and edge type column 478. Edge table 470 can include one or more data rows, where each data row corresponds to an edge connecting two vertices in the layered graph data structure. For a data row corresponding to an edge, the data entry stored in second graph identifier column 472 corresponds to the graph for which the vertex identified in first node identifier column 474 (and the edge) belongs, the data entry stored in first node identifier column 474 corresponds to the vertex identifier for the vertex on one side of the edge, the data entry stored in the second node identifier column 476 corresponds to the vertex identifier for the vertex on the other side of the edge, and the data entry stored in edge type column 478 corresponds to type of edge connecting the vertices identified in first node identifier column 474 and second node identifier column 476. For example, as shown in FIG. 4, data row 480 corresponds to an edge that is part of the graph with graph identifier 210 and connects the vertices having vertex identifiers 113 and 124, and data row 482 corresponds to an edge that is part of the graph with graph identifier 230 and connects the vertices having vertex identifiers 132 and 141.

Each data row of edge table 470 can include a data value stored in edge type column 478 that reflects the nature of the edge connecting the vertices identified in first node identifier column 474 and second node identifier column 476. The values stored in edge type column 478 can be a string, numerical value (e.g., integer, long, float, double), or enumeration value. In some embodiments, the data entries of edge type column 478 can be values that link to another data table (not shown) in the database used to store the layered graph data structure that stores enumeration values (or other values) indicative of the edge type. In the example of FIG. 4, edge type column 478 stores string values, either "Internal" or "External" indicating the edge type, both other edge type values are contemplated.

According to some embodiments, the value in edge type column 478 can be used by a query service to identify one or more vertices responsive to a query of data related to a layered graph data structure instance. For example, the query service might find vertices that are connected with the same graph by finding data rows in edge type column 478 having "Internal" as data entries. The query service may also find vertices connected through several layers of the layered graph structure by performing iterative searches on edge table 470 for data rows "External" as a data entry in edge type column 478. Operations of an example query service, and how a query service may use data values stored in edge type column 478 is explained in more detail below with respect to query service 623 of FIG. 6.

While the examples shown in FIG. 4 show data stored relative to the primary layer of the layered graph data structure, in some embodiments, other layers of the layered graph data structure can be stored. For example, in some embodiments, vertex table 450 can include data rows where the data stored in vertex identifier column 452 are, in reality, graph identifiers for graphs of the primary (or some lower) layer. For example, vertex table 450 might have a data row where 240 is stored in vertex identifier column 452 and 320 is stored in first graph identifier column 453.

Likewise, edge table 470 may include rows corresponding to edges of graphs at layers of the layered graph data structure other than the primary level. For example, edge table 470 may have a data row where second graph identifier column 472 stores 320, first node identifier column 474 stores 230, second node identifier column 476 stores 240, and edge type column 478 stores "External."

Storage of layers other than the primary layer may provide additional query speed advantages in some embodiments, while in other embodiments, storage of layers other than the primary layer may not be necessary. Accordingly, the number of layers stored in vertex table 450 and edge table 470 may vary depending on the needs of the data domain being modeled with the layered graph data structure.

As the size of a layered graph data structure increases, the database storing the layered graph data structure may be sharded and distributed to improve search efficiency. Database sharding is a technique where large databases are divided, or sharded, into smaller, faster, and more easily managed parts called data shards. When sharding, database tables are divided horizontally such that each data shard stores a subset of the data rows that would normally be stored in the same database table. For example, a data table storing one million rows of data could be sharded into two data shards with the first data shard storing rows one to 499,999 and the second data shard storing rows 500,000 to 1,000,000.

Figure 5:
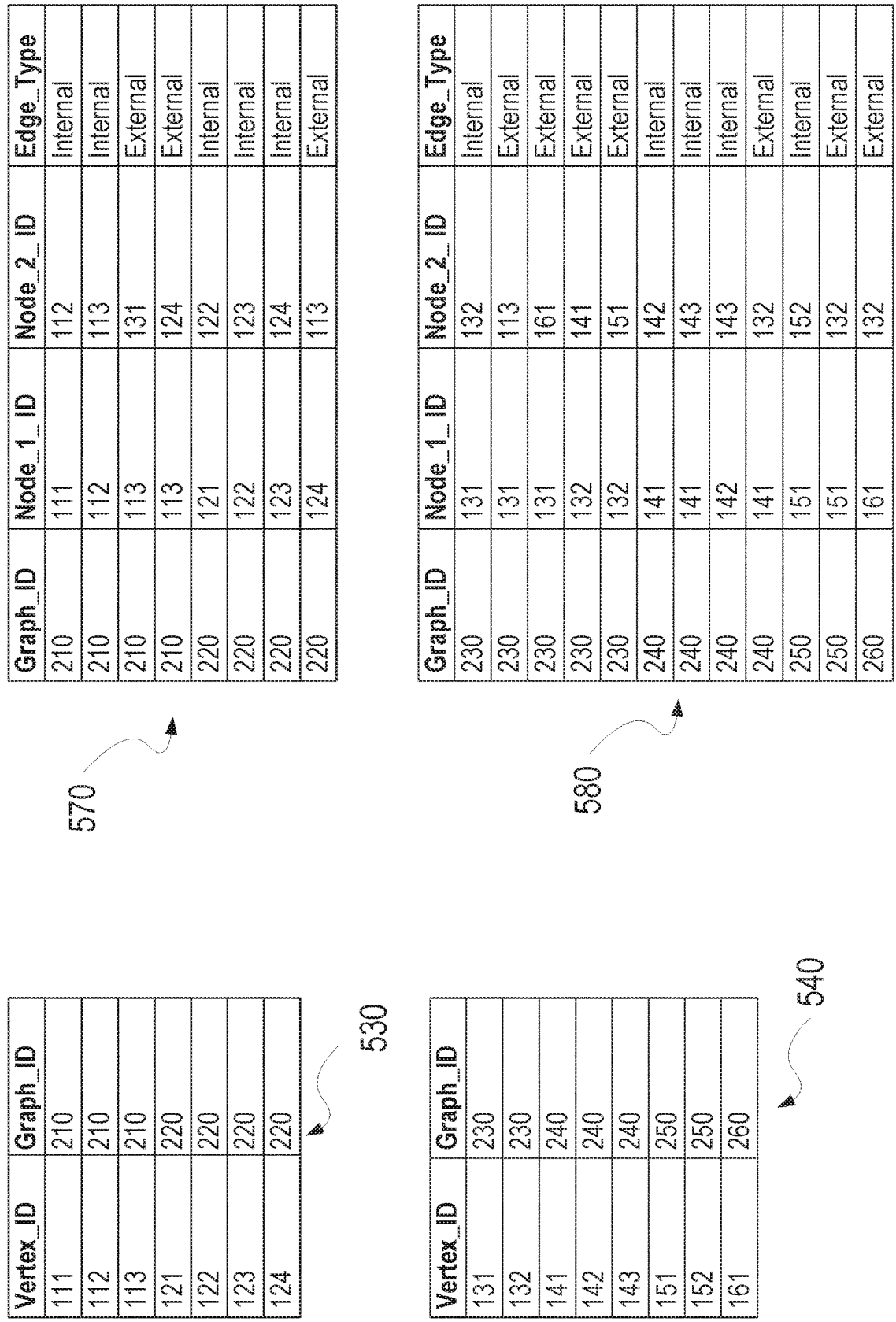
FIG. 5 shows example tables and data entries for storing a layered graph data structure using sharding consistent with disclosed embodiments.

FIG. 5 shows example tables and data entries for storing a layered graph data structure using database sharding. While the layered graph data structure could be stored using any sharding technique, one example providing efficiency is to shard vertex table 450 by values stored in vertex identifier column 452 and to shard edge table 470 by values stored in second graph identifier column 472. To improve efficiency, both vertex table 450 and edge table 470 can be sharded such that each shard stores a consecutive range of values. For example, as shown in FIG. 5, vertex table 450 can be sharded into data shard 530, which stores vertex identifiers ranging from 100 to 129, and data shard 540, which stores vertex identifiers ranging from 130 to 170. As another example, as shown in FIG. 5, edge table 470 can be sharded into data shard 570, which stores graph identifiers 200 to 229, and data shard 580 which stores graph identifiers 230 to 270.

Figure 6:
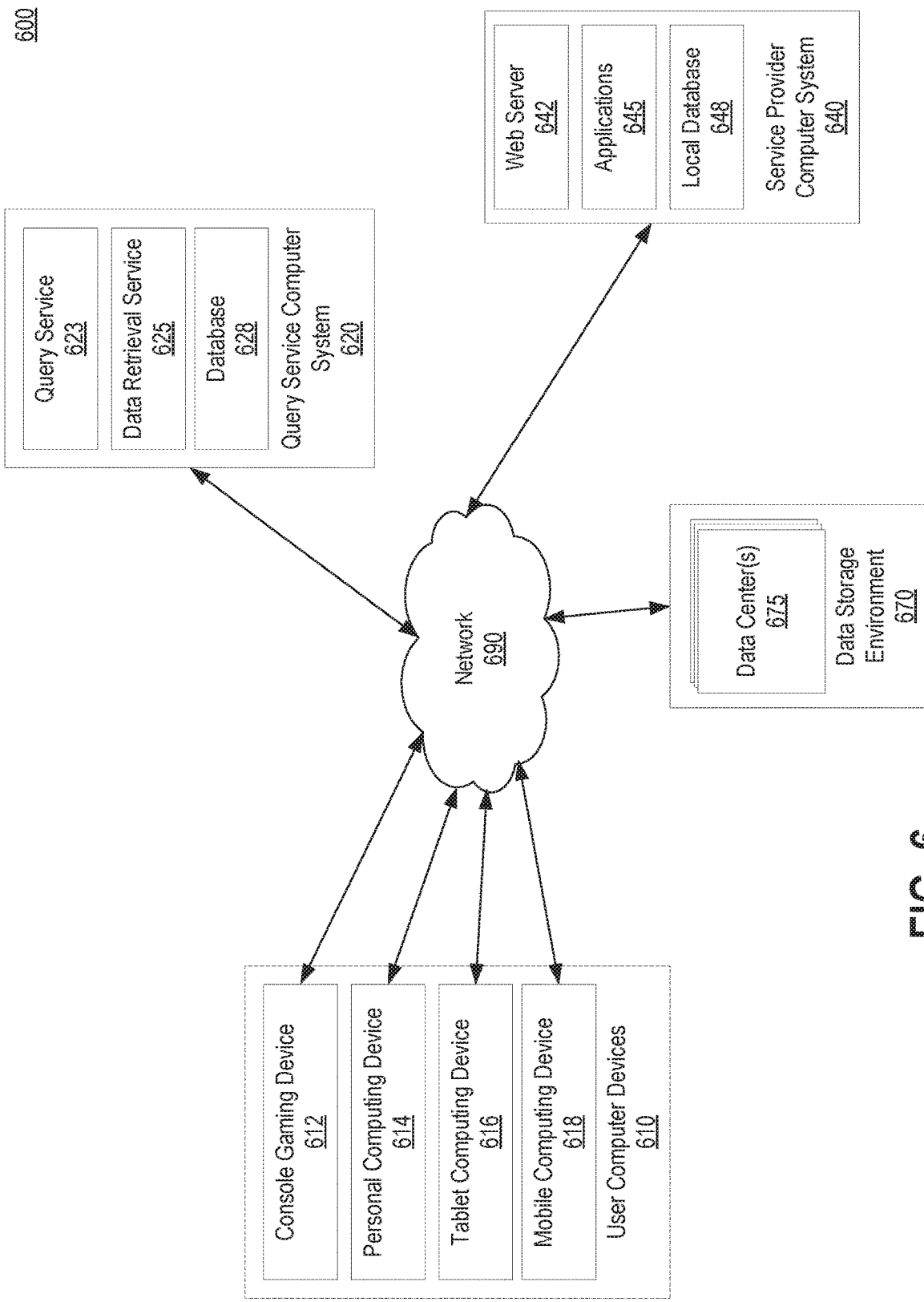
FIG. 6 shows an example computer network architecture for storing and querying layered graph data structures consistent with disclosed embodiments.

FIG. 6 illustrates, in block form, system 600 for storing, using, and/or managing data stored in a layered graph data structure consistent with disclosed embodiments. In the embodiment illustrated in FIG. 6, one or more user computing devices 610, query service computer system 620, service provider computer system 640, and data storage environment 670 can communicate via network 690.

System 600 outlined in FIG. 6 can be computerized, wherein each of the illustrated components comprises a computing device that is configured to communicate with other computing devices via network 690. For example, user computing devices 610 can include one or more computing devices, such as a console gaming device 612, personal computing device 614, table computing device 616, and/or mobile computing device 618 that are configured to transmit and receive data to/from other computing devices, such as service provider computer system 640, via network 690. As another example, service provider computer system 640 can communicate via network 690 with query service computer system 620 to obtain data that may be needed to perform service requests received from user computer devices 610. Likewise, query service computer system 620 may communicate with data storage environment 670 to accesses one or more databases storing data that are part of a layered graph data structure consistent with disclosed embodiments.

In some embodiments, query service computer system 620, service provider computer system 640, and/or data storage environment 670 can include a server, server cluster, and/or a distributed execution environment (not shown). In some embodiments, these computing systems can be implemented using one or more computing devices dedicated to performing the respective operations of the systems as described herein, or these computing systems can be implemented to perform additional tasks or operations.

In some embodiments, query service computer system 620 includes query service 623. Query service 623 can perform one or more query operations on a data source storing a layered graph data structure. For example, query service 623 can perform operations to add or remove vertices from a layered graph data structure or perform searches on the layered graph data structure responsive to a query and return result sets responsive to the query. In some embodiments, query service 623 receives requests from service provider computer system 640, and service provider computer system 640 may use the result sets it receives to provide information or services to user computer devices 610.

In some embodiments, query service 623 exposes an application programming interface (API) that provides a result set of related entities, or information about them, that are related to a target entity. An entity can include any person, place, or thing that is modeled as a vertex or graph at any level within a layered graph data structure. Examples of entities can include, but are not limited to, users, user accounts, computing devices, avatars, characters, locations, organizations, business, products, teams, groups, to name some examples. The API may request a target entity, or data related to a target entity, as input. The target entity then serves as the starting point for query service 623 when conducting a search for related entities. For example, target entity input data can include a string identifying a particular user or a numeric value representing a product stock keeping unit (SKU) number. The API may return a result set of data corresponding to related entities that are related to the target entity associated with the input. For example, the API may return data corresponding to entities that are social media friends or connections of the target entity.

According to some embodiments, query service 623 can expose an API that accepts data related to a target entity and a graph level as input and returns a result set having data related to related entities of the target entity. The graph level can indicate the layer of the layered graph data structure where the target entity and the related entities are connected. For example, when the graph level is a numeric value, the graph level can correspond to the layer of the graph where the entities are directly related. The graph level can also include a string that correlates to a layer of the graph. For example, when a layered graph data structure is modeling a social network, the graph level can be a string and possible values could include "close friends," "acquaintances," or "friends of friends," which in turn might correspond to the second layer, third layer, and fourth layer of a layered graph data structure respectively.

Query service 623 may expose APIs requesting a graph level to improve performance of queries—query service 623 need only perform iterations needed to identify data congruent with the provided graph level. When combined with the structure of the tables storing the layered graph data structure and data sharding techniques (e.g., the tables identified in FIGS. 4 and 5), query service 623 can perform search operations faster than what can be achieved in a traditional relational database that does not take into consideration graph level or a layered graph data structure.

To further illustrate how query service 623 may respond to requests received on an API that accepts a target entity and a graph level as input and returns a result set having data related to related entities of the target entity, the following three non-exhaustive examples are provided. The examples below correspond to three different use cases: (Example 1) find related entities for a target entity that are part of the same graph at the primary level (e.g., a graph level=0 case); (Example 2) find entities that are one-connection removed from the target entity at the primary level or connected directly to the target entity at the second layer of the layered graph data structure (e.g., a graph level=1 case); and (Example 3) find entities that are two-connections removed from the target entity at the primary level or connected directly to the target entity in the third layer of the layered graph data structure (e.g., a graph level=2 case).

For Example 1 (graph level=0): Query service 623 may first access vertex table 450 to find a graph identifier of the graph to which the provided vertex identifier belongs. Next, query service 623 may access edge table 470 to determine the edges of the graph matching the graph identifier. For the edges (data rows) matching the graph identifier, query service 623 can determine which edges link vertices within the graph, for example, those edges with "Internal" as the data entry in edge type column 478. The query service may then analyze the determine edges to find vertex identifiers of the vertices that are part of the same graph.

Example 1 can be further explained using the example data entries shown in FIG. 4. Query service 623 may receive a request for all vertices that are within the same graph as vertex 123, which can include a call to the API with the target entity value set to data identifying vertex 123 and the graph level equal to 0. First, query service 623 accesses vertex table 450 to find the graph to which vertex 123 belongs. As shown in FIG. 4, vertex 123 belongs to graph 220. Next, query service 623 accesses edge table 470 to find the edges having a data value of 220 in second graph identifier column 472, and finds four data rows 483, 484, 485, 486. Data rows 483, 484 and 485 have data entries of "Internal" in edge type column 478 while data row 486 has "External" in edge type column 478. Accordingly, query service 623 may analyze the data entries in the first node identifier and second node identifier columns of data rows 483, 484, and 485 to determine which vertices are internal connected within graph 220, and through this analysis can determine that vertices 121, 122 and 124 are within the same graph as vertex 123. Query service 623 can then return a result set to the requester identifying vertices 121, 122, and 124 or information related to those vertices.

For Example 2 (graph level=1): Query service 623 may first access vertex table 450 to find a graph identifier of the graph to which the provided target vertex identifier belongs. Next, they query service may access edge table 470 to determine the edges of the graph matching the graph identifier. For the edges (data rows) matching the graph identifier, the query service can determine which edges link vertices within the current graph to vertices outside of the current graph, for example, those edges with "External" as the data entry in edge type column 478.

For each determined external edge, query service 623 identifies the vertex of the edge that is not part of the current graph to identify a set of vertices to perform a next iteration of the search. Query service 623 may then perform the next iteration of the search by accessing the vertex table 450 to determine the respective graph identifiers for the vertices identified in the previous iteration. For each of the determined graph identifiers, query service 623 accesses the edge table 470 to determine the edges of the graph matching the graph identifiers. For the edges (data rows) matching the graph identifier, the query service can determine which edges link vertices within the current graph, for example, those edges with "Internal" as the data entry in edge type column 478. Query service 623 may add those vertices, or data related to those vertices, to the result set and return the result set to the request.

Example 2 can be further explained using the example data entries shown in FIG. 4. Query service 623 may receive a request including a target entity matching vertex 113 and a graph level of 1 (or data or a string indicating a graph level of 1). First, query service 623 accesses vertex table 450 to find the graph to which vertex 113 belongs. As shown in FIG. 4, vertex 113 belongs to graph 210. Next, query service 623 accesses edge table 470 to find the data rows (edges) in the edge table belonging to graph 210, which are data rows 480, 487, 488, and 489. As the received graph level is equal to 1, and this is the first search iteration accessing the edge table, query service 623 analyzes data rows 480, 487, 488, 489 to find which edges link vertices of graph 210 to other graphs within the layered graph data structure at the primary (or first) level. As shown in FIG. 4, data rows 480 and 489 have an edge type of "External." Query service 623 analyzes data rows 480 and 489 to identify vertices not belonging to graph 210 (this may be done in some embodiments by comparing the data entries in the first node identifier and second node identifier columns of internal edges and external edges). In this example, vertices 124 and 131 are not in graph 210. Query service 623 will then use vertices 124 and 131 in the next (second) iteration.

On the second iteration of Example 2, query service accesses vertex table 450 to finds the graphs to which vertices 124 and 131 belong. As shown in FIG. 4, vertex 124 belongs to graph 220 and vertex 131 belongs to graph 230. Query service 623 then accesses edge table 470 to find the edges belonging to graphs 220 and 230. Since the received graph level is 1, and query service 623 is performing a second iteration, it will analyze the data rows of entity table 470 matching graphs 220 and 230 for those edges that are internal to each graph, and through an analysis of these rows, prepare a result set containing information related to the vertices found in each edge.

For Example 3 (graph level=2): Query service 623 may first access vertex table 450 to find a graph identifier of the graph to which the provided target vertex identifier belongs. Next, the query service may access edge table 470 to determine the edges of the graph matching the graph identifier. For the edges (data rows) matching the graph identifier, the query service can determine which edges link vertices within the current graph to vertices outside of the current graph, for example, those edges with "External" as the data entry in edge type column 478.

For each determined external edge, query service 623 identifies the vertex of the edge that is not part of the current graph to identify a set of vertices to perform a next (or second) iteration of the search. Query service 623 may then perform the next (or second) iteration of the search by accessing the vertex table 450 to determine the respective graph identifiers for the vertices identified in the previous iteration. For each of the determined graph identifiers, query service 623 accesses the edge table 470 to determine the edges of the graph matching the graph identifiers. For the edges (data rows) matching the graph identifier, the query service can determine which edges link vertices within the current graph to vertices outside of the current graph, for example, those edges with "External" as the data entry in edge type column 478. For each determined external edge, query service 623 identifies the vertex of the edge that is not part of the current graph to identify a set of vertices to perform the next (third) iteration of the search. Query service 623 may then perform the next (third) iteration of the search by accessing the vertex table 450 to determine the respective graph identifiers for the vertices identified in the previous (second) iteration. For each of the determined graph identifiers, query service 623 accesses the edge table 470 to determine the edges of the graph matching the graph identifiers. For the edges (data rows) matching the graph identifier, the query service can determine which edges link vertices within the current graph, for example, those edges with "Internal" as the data entry in edge type column 478. Query service 623 may add those vertices, or information related to those vertices, to the result set and return the result set to the request.

Example 3 can be further explained using the example data entries shown in FIG. 4. Query service 623 may receive a request including a target entity matching vertex 113 and a graph level of 2 (or data or a string indicating a graph level of two). First, query service 623 accesses vertex table 450 to find the graph to which vertex 113 belongs. As shown in FIG. 4, vertex 123 belongs to graph 210. Next, query service 623 accesses edge table 470 to find the data rows (edges) in the edge table belonging to graph 210, which are data rows 480, 487, 488, 489. As the received graph level is equal to 1, and this is the first search iteration accessing the edge table, query service 623 analyzes data rows 480, 487, 488, 489 to find which edges link vertices of graph 210 to other graphs within the layered graph data structure at the primary (or first) level. As shown in FIG. 4, data rows 480 and 489 have an edge type of "External." Query service 623 analyzes data rows 480 and 489 to identify vertices not belonging to graph 210 (this may be done in some embodiments by comparing the data entries in the first node identifier and second node identifier columns of internal edges and external edges). In this example, vertices 124 and 131 are not in graph 210. Query service 623 will then use vertices 124 and 131 in the next (second) iteration.

On the second iteration of Example 3, query service accesses vertex table 450 to finds the graphs to which vertices 124 and 131 belong. As shown in FIG. 4, vertex 124 belongs to graph 220 and vertex 131 belongs to graph 230. Query service 623 then accesses edge table 470 to find the edges belonging to graphs 220 and 230. Since the received graph level is 2, and query service 623 is performing a second iteration, it will analyze the data rows of entity table 470 similar to the first iteration—query service 623 analyzes data rows 482, 483, 484, 485, 486, 490, 491, and 493 to find which edges link vertices of graphs 220 and 230 to other graphs within the layered graph data structure at the second level. As shown in FIG. 4, data rows 482, 486, 491, 492 and 493 have an edge type of "External." Query service 623 analyzes data rows 482, 486, 491, 492 and 493 to identify vertices not belonging to graphs 220 and 230 (this may be done in some embodiments by comparing the data entries in the first node identifier and second node identifier columns of internal edges and external edges). In this example, vertices 113, 141, 151, 161 are not in graphs 220 and 230. Query service 623 will then use vertices 113, 141, 151, 161 in the next (third) iteration.

On the third iteration of Example 3, query service accesses vertex table 450 to finds the graphs to which vertices 113, 141, 151, 161 belong. As shown in FIG. 4, vertex 113 belongs to graph 210, vertex 141 belongs to graph 240, vertex 151 belongs to graph 250, and graph 161 belongs to graph 260. Since graph 210 was analyzed in a previous iteration (the first), query service 623 does not perform additional operations for it. As a result, query service 623 then accesses edge table 470 to find the edges belonging to graphs 240, 250, and 260. Since the received graph level is two, and query service 623 is performing a third iteration, it will analyze the data rows of entity table 470 matching graphs 220 and 230 for those edges that are internal to each graph, and through an analysis of these rows, prepare a result set containing information related to the vertices found in each edge.

The examples above can be further expanded to address embodiments where the layered graph data structure has more layers or the requested graph level is greater than two. Moreover, while the examples above use graph level have a numeric value, in some embodiment, the requested graph level can be expressed as a string or enumeration value, and in such embodiments, query service 623 may perform additional operations (e.g., use a look up table or hash table to translate received graph level strings into numeric graph level values) to convert the string or enumeration value into a numeric value.

With reference returning to FIG. 6, query service computer system 620 can also include data retrieval service 625 which can be perform one or more operations related to data retrieval from data sources such as database 628 (e.g., a local database of query service computer system) or data storage environment 670. For example, data retrieval service 625 may perform operations for construction SQL queries for locating data needed to respond to requests received by query service 623.

In some embodiments, data retrieval service 625 can perform operations to determine the location of data shards and direct data requests to the appropriate data shard depending on the needs of query service 623. For example, if query service 623 requires data rows from edge table 470 corresponding to graph identifier "123456", data retrieval service 625 may accesses a lookup table indicating the location of the data shard storing edges of graph "123456." According to some embodiments, the data shard lookup table may be stored in database 628 of query service computer system. As indicated above, vertex table 450 can be sharded by data values stored in vertex identifier column 452 and edge table 470 can be sharded by data values stored in second graph identifier column 472. Accordingly, data retrieval service 625 can perform operation to determine the appropriate data shard for either a vertex identifier or graph identifier based on ranges associated with each shard. The ranges may be stored in a lookup table in database 628.

According to some embodiments, database 628 can be any database system capable of storing data in an organized fashion. For example, database 628 can be implemented as a flat file database, relational database, object database, or the like. In some embodiments, database 628 merely stores data related to locating data shards or other management or configuration information related to query service 623 or data retrieval service 625. In some embodiments, local storage of data related to locating data shards or other management or configuration information may be preferred for speed or efficiency reasons, but in other embodiments, data related to locating data shards or other management or configuration information might be stored remotely in data storage environment 670 or in some other remote location.

System 600 can also include data storage environment 670. Data storage environment 670 can one or more data centers that store data of the layered graph data structure. In some embodiments, data storage environment 670 can expose an API allowing for querying of specific data centers for data, which can assist in more efficient query operation. For example, data storage environment 670 can provide an API that allows data retrieval service 625 to run queries on a particular data center 675 when the layered graph data structure is sharded among multiple data locations.

Depending on the embodiment, network 690 can include one or more of any type of network, such as one or more local area networks, wide area networks, personal area networks, telephone networks, and/or the Internet, which can be accessed via any available wired and/or wireless communication protocols. For example, network 690 can comprise an Internet connection through which user computer devices 610 and service provider computer system 640 communicate. Any other combination of networks, including secured and unsecured network communication links are contemplated for use in the described systems.

Figure 7:
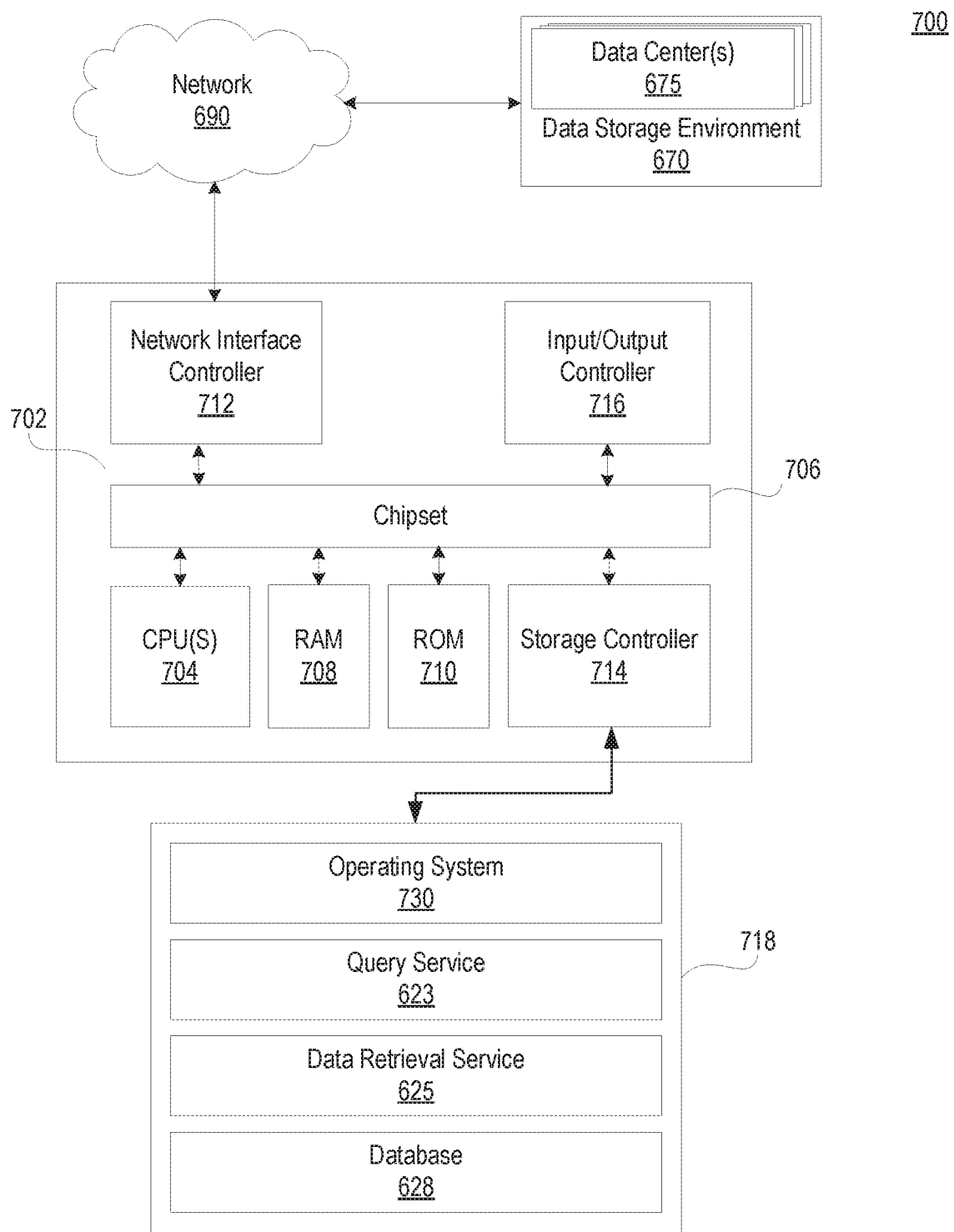
FIG. 7 shows a computer architecture diagram showing one illustrative computer hardware architecture for implementing aspects of disclosed embodiments.

FIG. 7 shows an example computer architecture for a computer 700 capable of executing the program components described above for performing actions for responding to queries related to a layered graph data structure in a distributed execution environment or in a non-distributed execution environment. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described.

Computer 700 includes baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with chipset 706. CPUs 704 may be standard programmable processors that perform arithmetic and logical operations necessary for the operation of the computer 700.

CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

Chipset 706 provides an interface between CPUs 704 and the remainder of the components and devices on baseboard 702. Chipset 706 may provide an interface to a random access memory ("RAM") 708, used as the main memory in computer 700. Chipset 706 may further provide an interface to a computer-readable storage medium such as read-only memory ("ROM") 710 or non-volatile RAM ("NVRAM") for storing basic routines that help to startup computer 700 and to transfer information between the various components and devices. ROM 710 or NVRAM may also store other software components necessary for the operation of computer 700 in accordance with the embodiments described herein.

Computer 700 may operate in a networked environment using logical connections to remote computing devices and computer systems through a network, such as network 690. Chipset 706 may include functionality for providing network connectivity through NIC 712, such as a gigabit Ethernet adapter. NIC 712 is capable of connecting computer 700 to other computing devices over network 690. It should be appreciated that multiple NICs 712 may be present in computer 700, connecting the computer to other types of networks and remote computer systems.

Computer 700 may be connected to mass storage device 718 that provides non-volatile storage for the computer. Mass storage device 718 may store system programs, application programs, other program modules, and data, which have been described in greater detail herein. Mass storage device 718 may be connected to computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether mass storage device 718 is characterized as primary or secondary storage, and the like.

For example, computer 700 may store information to mass storage device 718 by issuing instructions through storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of disclosed embodiments, with the foregoing examples provided only to facilitate description. Computer 700 may further read information from mass storage device 718 by detecting the physical states or characteristics of one or more particular locations within the physical storage units.

In addition to mass storage device 718 described above, computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Mass storage device 718 may store operating system 730 utilized to control the operation of computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. Mass storage device 718 may store other system or application programs and data utilized by computer 700, such as conversion service 115, document collection service 120, user interface service 125, database 130, original document storage 135, intermediate document storage 140, and/or display document storage 145 or any of the other software components and data described above. Mass storage device 718 might also store other programs and data not specifically identified herein.

In one embodiment, mass storage device 718 or other computer-readable storage media is encoded with computer-executable instructions which, when loaded into computer 700, transforms the computer from a general-purpose computing system into a special-purpose computer capable of implementing the embodiments described herein. These computer-executable instructions transform computer 700 by specifying how CPUs 704 transition between states, as described above. According to one embodiment, computer 700 has access to computer-readable storage media storing computer-executable instructions which, when executed by the computer 700, perform the various routines and processes described with respect to disclosed embodiments.

Computer 700 may also include one or more input/output controllers 716 for receiving and processing input from a number of input devices, such as a keyboard, a mouse, a touchpad, a touch screen, an electronic stylus, or other type of input device. Input/output controllers 716 might also receive input from a digital camera and/or video camera, a GPS sensor, a compass, a gyroscope, or another type of sensor utilized to determine the location and/or the orientation of computer 700. Input/output controller 716 might also be connected to one or more wireless radios for facilitating wireless communication with computer 700.

Input/output controller 716 might also provide output to a display, such as a computer monitor, a flat-panel display, a digital projector, a printer, a plotter, or other type of output device. It will be appreciated that computer 700 may not include all of the components shown in FIG. 7, may include other components that are not explicitly shown in FIG. 7, or may utilize an architecture completely different than that shown in FIG. 7. For example, computer 700 might be implemented utilizing system on a chip ("SOC") technologies and other types of technologies suitable for use in implementing smartphones, tablet computing devices, and other types of mobile computing devices.

Based on the foregoing, it should be appreciated that technologies for performing document annotation within a distributed execution environment or a non-distributed execution environment have been presented. Moreover, although the subject matter presented has been described in language specific to computer structural features, methodological acts, and computer readable media, it is to be understood that the appended claims are not necessarily limited to the described specific features, acts, or media. Rather, the specific features, acts, and mediums are disclosed as example implementations.

Figure 8:
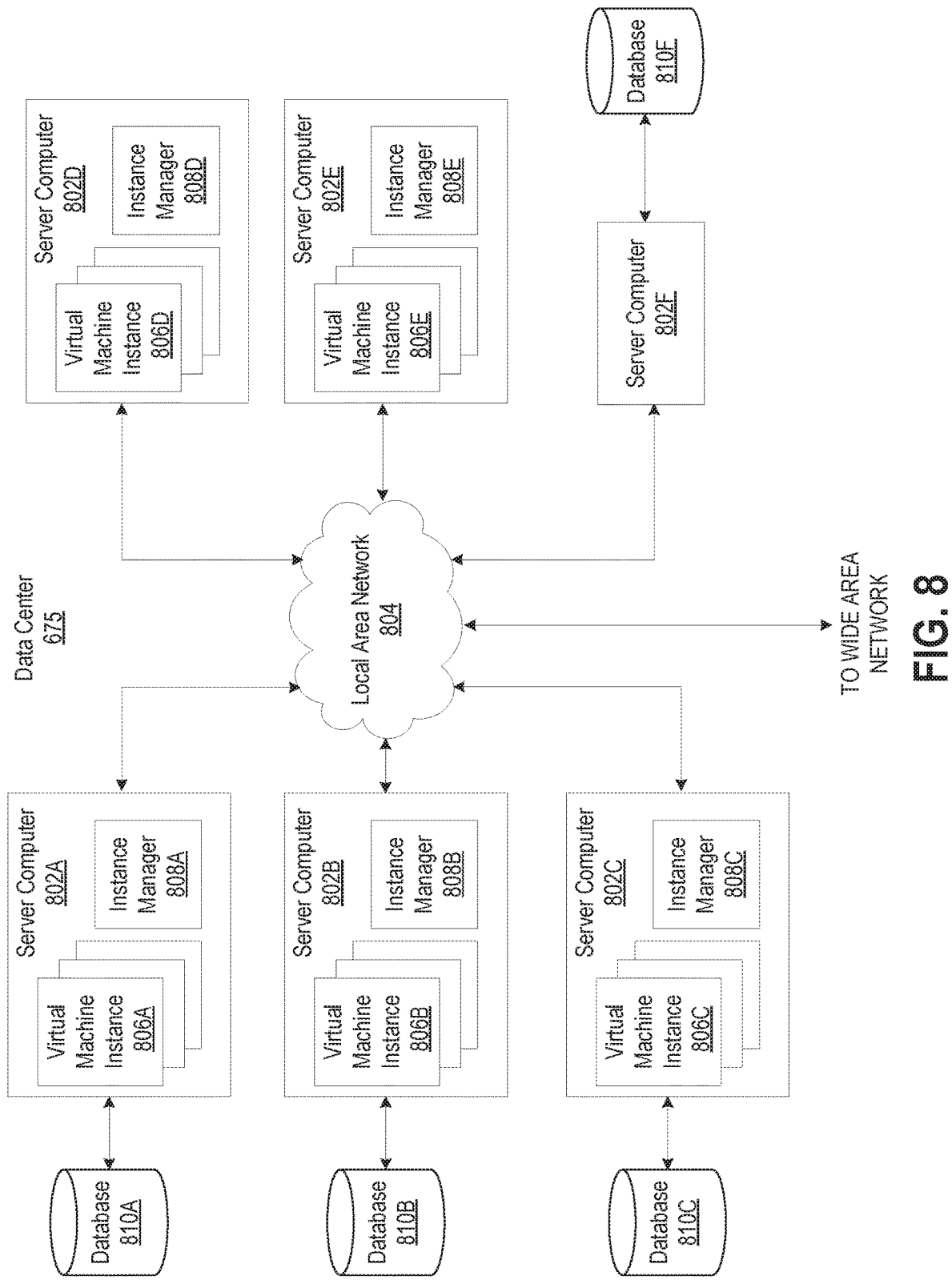
FIG. 8 shows a computing system diagram showing one configuration for a data center implementing aspects of disclosed embodiments.

FIG. 8 is a computing system diagram that illustrates one configuration for data center 675 that implements a distributed execution environment including the concepts and technologies disclosed herein for storing a layered graph data structure. The example data center 675 shown in FIG. 8 includes several server computers 802A-802F (which may be referred to herein singularly as "server computer 802" or in the plural as "server computers 802"). As mentioned briefly above, server computers 802 may be standard tower or rack-mount server computers configured appropriately for providing the computing resources described herein. For example, in one implementation server computers 802 are configured to provide virtual machine instances 806A-806E.

A virtual machine instance can be an instance of a software implementation of a machine (e.g., a computer) that executes programs like a physical machine. Each of servers 802 may be configured to execute an instance manager 808 capable of instantiating and managing virtual machine instances 806. Instance manager 808 might be a hypervisor or another type of program configured to enable the execution of multiple virtual machine instances 806 on a single server 802, for example. In some embodiments, data center 675 shown in FIG. 8 can include server computer 802F that is reserved for executing software components for managing the operation of data center 704, server computers 804, virtual machine instances 806, and other resources within a distributed execution environment.

It should be appreciated that although the embodiments disclosed herein are described primarily in the context of virtual machine instances 806, other types of instances of computing resources can be utilized with the concepts and technologies disclosed herein. For instance, the technologies disclosed herein might be utilized with instances of hardware resources, instances of data storage resources, instances of data communications resources, instances of networking resources, instances of database resources, and with other types of instances of computing resources.

In the example data center 675 shown in FIG. 8, local area network ("LAN") 804 can be utilized to interconnect server computers 802A-802E and server computer 802F. LAN 804 can also be connected to wide area network. It should be appreciated that the configuration and network topology illustrated in FIGS. 7 and 8 has been greatly simplified and that many more computing systems, networks, and networking devices may be utilized to interconnect the various computing systems disclosed herein. Appropriate load balancing devices or software modules might also be utilized for balancing a load between one or more data centers, between each of the server computers 802A-802F in each data center 675, and between virtual machine instances 806 provided by the server computers 802A-802F.

It should be appreciated that the data center 675 described in FIG. 8 is merely illustrative and that other implementations might be utilized. Additionally, it should be appreciated that the functionality provided by these components might be implemented in software, hardware, or a combination of software and hardware. Other implementations should be apparent to those skilled in the art.

Figure 9:
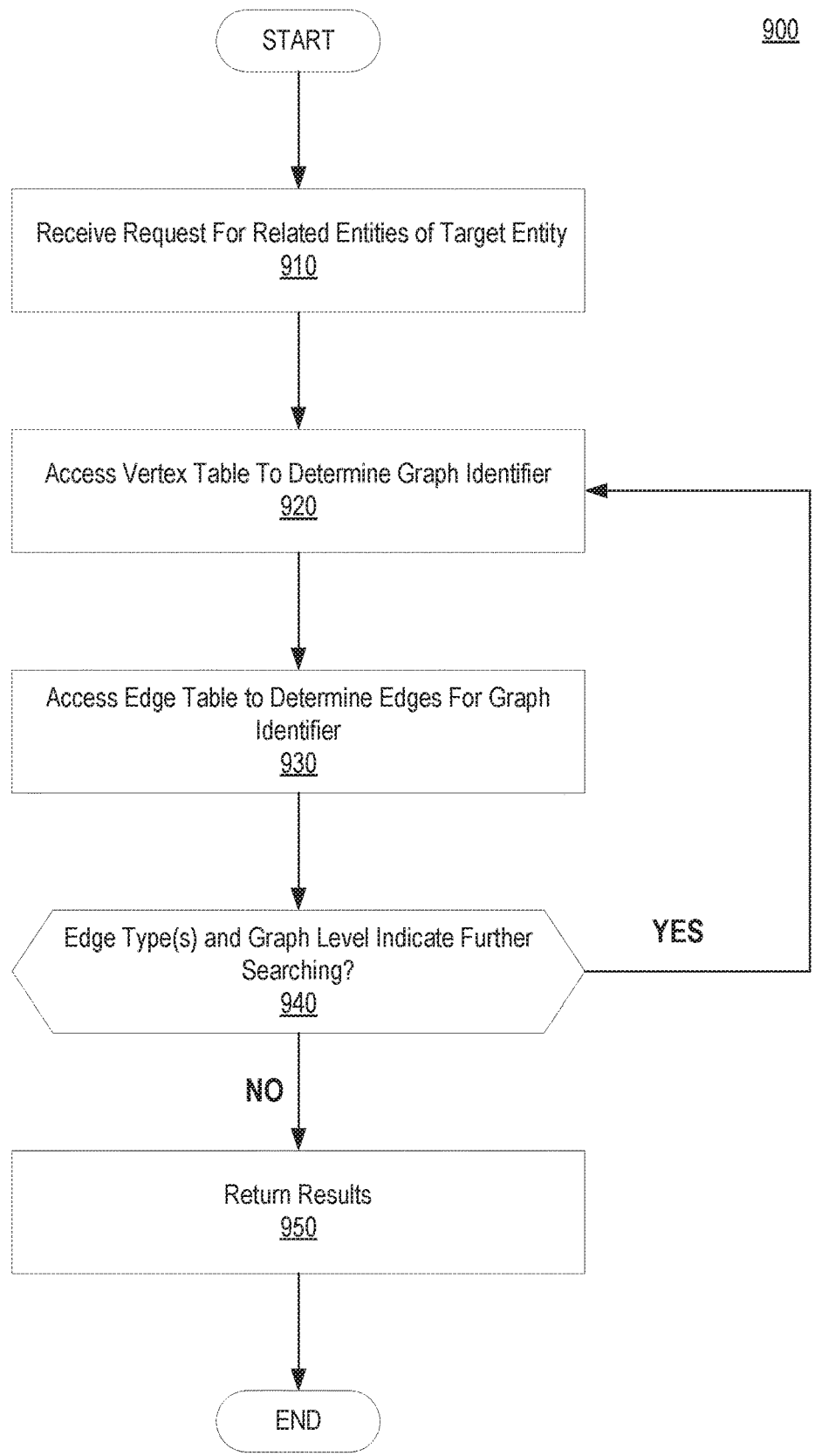
FIG. 9 shows a flow chart for responding to a query of data stored using layered graph data structures consistent with disclosed embodiments.

FIG. 9 shows a flowchart representing an example query response process 900 for responding to queries to find related entities that are related to a target entity. In some embodiments, the target entity and the related entity are modeled as vertices in the layered graph data structure. The target entity and the related entities can be vertices at the primary layer of the layered graph data structure or they may be logical vertices corresponding to vertices at higher layers of the layered graph data structure.

According to some embodiments, query response process 900 can be performed by one or more components of a query service computer system such as query service computer system 620. Although the following discussion describes query response process 900 as being performed by a query service (such as query service 623), other components of a computer system configured to respond to queries for data stored in a layered graph data structure can perform process 900 without departing from the spirit and scope of the present disclosure. For example, in some embodiments, some portions of process 900 may be performed by data retrieval service 625, or some other logical processing component.

A query service begins performance of query response process 900 at step 910 where the query service receives a request for related entities of a target entity. In some embodiments, the request may be received via an API that accepts as a parameter data referencing a target entity (e.g., a vertex identification number, user name, user account number, email address, product identification number, or any other identifier that may be used to identify an entity within the domain that the layered graph data structure is modeling). The API may also accept as a parameter a graph level, which can include a numeric value, string value, or enumeration value, for example, indicating the connection distance between the target entity and the related entity at the primary level of the layered graph data structure or at which layer in the layered graph data structure the target entity and the related entity are directly connected. For example, a graph level of zero indicates that the related entities are within the same graph as the target entity, while a graph level of two indicates that the related entities are two connections away from the target entity at the primary layer, and directly connected at the second layer of the layered graph data structure.

At step 920, the query service accesses a vertex table to identify the graph or graphs to which the target entity belongs. On the first search iteration, the target entity can be the entity received with the request at step 910. On later iterations, the target entity or target entities can be determined based on values found in the edge table (as described in more detail below).

Once the query service identifies the graph or graphs to which the target entity (or entities) belongs, processing continues to step 930. At step 930, the query service finds data rows in the edge table having graph identifier values matching the graph identifiers found in step 920. For each data row found, the query service determines if it should perform additional iterations (step 940). In some embodiments, the query service makes this determination based on the edge type values in each found data row and the requested graph level. For example, if the current iteration is greater than the requested graph level (e.g., current iteration is the first and requested graph level is zero), then no further searching is required (step 940: NO). The query service may analyze data rows with edge types corresponding to internal edges to identify vertices that correspond to the requested, related entities. At step 950, the query service generates a result set including information related to vertices found in the current iteration, and returns the result set to the requester.

On the other hand, if the current iteration is less than or equal to the requested graph level (e.g., current iteration is two and requested graph level is three), then further searching may need to be performed (step 940: YES). In such cases, the query service may analyze data rows with edge types corresponding to external edges to identify vertices that are of graphs that need to be further searched in subsequent iterations. The query service may set the target entities to these identified vertices, and processing returns to step 920 for the next search iteration.

The subject matter described above is provided by way of illustration only and should not be construed as limiting. Furthermore, the claimed subject matter is not limited to implementations that solve any or all disadvantages noted in any part of this disclosure. Various modifications and changes may be made to the described subject matter described without following the example embodiments and applications illustrated and described, and without departing from the true spirit and scope of the disclosed embodiments.

Moreover, as indicated above, the disclosed embodiments can operate in conjunction with a network-based distributed execution environment in which a database, data storage environment, or query service can purchase, configure, and utilize computing resources, such as virtual machine instances, data storage resources, networking resources, and database resources, on a permanent or as-needed basis. In some embodiments, the network-based distributed execution environment may offer computing resources for purchase and use in various configurations. For example, the distributed execution environment might offer virtual machine instances available for purchase and use that have many different configurations of processor capabilities, main memory, disk storage, and operating system.

The subject matter above may be implemented as a computer process, a computer-controlled apparatus, a computing system, or an article of manufacture, such as a computer-readable storage medium. While the described subject matter is presented in the general context of modules, components, or processes that execute on one or more computing devices, other implementations may be performed in combination with other types of program modules, components, or processes. Moreover, the functionality performed by one or more of the disclosed modules, components, or processes may be performed by other disclosed modules, components, or processes without departing from the spirit and scope of disclosed embodiments. Generally, program modules include routines, programs, components, data structures, and other types of structures that perform particular tasks or implement particular abstract data types.

Aspects of the subject matter described herein may be practiced on or in conjunction with other computer system configurations beyond those described, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

What is claimed is:

1. A system comprising:
   one or more processors;
   computer readable media storing instructions that when executed by the one or more processors perform operations comprising:
   receiving a request to find related entities associated with a target entity, the request including an entity identifier corresponding to the target entity and a graph level of the request;
   exposing an application programming interface to receive the request;
   setting a target identifier to an initial value based on the entity identifier;
   performing one or more iterations based on the graph level of the request to generate a result set responsive to the request, wherein the one or more iterations include:
   accessing a vertex table, the vertex table including:
      a vertex identifier column, and
      a first graph identifier column;
   determining, from the vertex table, a graph identifier for the target identifier based on an entry in the first graph identifier column corresponding to an entry in the vertex identifier column matching the initial value of the target identifier;
   accessing an edge table, the edge table including:
      a second graph identifier column,
      a node identifier column, and
      an edge type column;
   determining a next identifier value based on an entry in the node identifier column corresponding to an entry in the second graph identifier column matching the graph identifier;
   determining to perform a next iteration of the one or more iterations based on:
      the graph level of the request, and
      an entry in the edge type column corresponding to the entry in the second graph identifier column matching the graph identifier;
   based on the determination to perform the next iteration:
      setting the value of the target identifier to the next identifier value and performing the next iteration, or
      adding entity information corresponding to the next identifier to the result set; and
   providing the result set via the application programming interface, the result set generated by performing a plurality of searches in the vertex table and the edge table, wherein a number of the plurality of searches is based on the graph level of the request.

2. The system of claim 1 wherein the system comprises a distributed system and the vertex table is sharded by the vertex identifier column.

3. The system of claim 1 wherein the system comprises a distributed system and the edge table is sharded by the second graph identifier column.

4. The system of claim 1 wherein data values in the edge type column indicate whether corresponding data values in the node identifier column link to a vertex within a same graph.

5. The system of claim 1 wherein data values in the edge type column indicate whether corresponding data values in the node identifier column link to a vertex outside of a same graph.

6. The system of claim 1 wherein the graph level comprises a numerical value.

7. The system of claim 1 wherein the graph level comprises a string value.

8. The system of claim 1 further comprising a query service exposing the application programming interface for receiving the request.

9. A method to find entities related to a target entity, the method comprising:
   exposing an application programming interface for receiving a request, the request including an entity identifier corresponding to a target entity and a representation of a graph level of the request;

receiving a request for a result set, the request including the entity identifier and the representation of the graph level of the request;

setting a target identifier to an initial value based on the entity identifier;

performing one or more iterations based on the graph level of the request to generate a result set responsive to the request, wherein the one or more iterations include:

obtaining, from a vertex table comprising a vertex identifier column and a first graph identifier column, a first graph identifier from the first graph identifier column by matching the initial value of the target identifier with a first data entry in the vertex identifier column;

locating, in an edge table comprising a second graph identifier column, a node identifier column, and an edge type column, a first data row where the first graph identifier matches a first entry in the second graph identifier column;

determining a first node identifier value based on a data entry in the node identifier column for the first data row;

determining to locate at least a second node identifier based on the representation of the graph level of the request and an entry in the edge type column corresponding to the entry in the second graph identifier column matching the first graph identifier;

based on the determination to locate the second node identifier, obtaining a second graph identifier from the vertex table by matching the first node identifier to a second data entry in the vertex identifier column;

locating a second data row in the edge table where the second graph identifier matches a second entry in the second graph identifier column;

determining the second node identifier based on a data entry in the node identifier column for the second data row;

adding information associated with the second node identifier to the result set;

generating the result set according to a plurality of searches in the vertex table and the edge table, wherein a number of the plurality of searches is based on the graph level of the request, and providing the result set in response to the request.

10. The method of claim 9 wherein the vertex table is sharded by the vertex identifier column.

11. The method of claim 9 wherein the edge table is sharded by the second graph identifier column.

12. The method of claim 9 wherein data values in the edge type column indicate whether corresponding data values in the node identifier column link to a vertex within a same graph.

13. The method of claim 9 wherein data values in the edge type column indicate whether corresponding data values in the node identifier column link to a vertex outside a same graph.

14. The method of claim 9 wherein the graph level comprises an integer value.

15. The method of claim 9 wherein the graph level comprises a string value.

16. A database system comprising:

one or more processors;

computer readable media operatively coupled to the one or more processors, the computer readable media storing tables including:

a vertex table comprising:
   a vertex identifier column, and
   a first graph identifier column; and
  an edge table comprising:
   a second graph identifier column,
   a node identifier column, and
   an edge type column;

a query service exposing an application programming interface for receiving a request, the request to find related entities associated with a target entity and comprising an entity identifier corresponding to the target entity and a graph level of the request; the database system configured to:

set a target identifier to an initial value based on the entity identifier;

perform one or more iterations based on the graph level of the request to generate a result set responsive to the request, wherein the one or more iterations include:

accessing the vertex table;

determining, from the vertex table, a graph identifier for the target identifier based on an entry in the first graph identifier column corresponding to an entry in the vertex identifier column matching the initial value of the target identifier;

accessing the edge table;

determining a next identifier value based on an entry node identifier column corresponding to an entry in the second graph identifier column matching the graph identifier;

determining to perform a next iteration of the one or more iterations based on:
   the graph level of the request, and
   an entry in the edge type column corresponding to the entry in the second graph identifier column matching the graph identifier;

based on the determination to perform the next iteration:
   setting the value of the target identifier to the next identifier value and performing the next iteration, or
   adding entity information corresponding to the next identifier to the result set;

wherein the application programming interface returns the result set generated by performing a plurality of searches in the vertex table and the edge table, wherein a number of the plurality of searches is based on the graph level of the request.

17. The database system of claim 16 wherein the vertex table is sharded by the vertex identifier column.

18. The database system of claim 16 wherein the edge table is sharded by the second graph identifier column.

* * * * *